US012641444B2

(12) United States Patent
Kim et al.

(10) Patent No.: US 12,641,444 B2
(45) Date of Patent: May 26, 2026

(54) DYNAMIC TRACKING OF REPORTING OF CELLULAR SERVICE OUTAGE AND METHOD OF OPERATION OF THE SAME

(71) Applicant: Boost SubscriberCo L.L.C., Englewood, CO (US)

(72) Inventors: Andrew Kim, Littleton, CO (US); Jeremy Conyers, Littleton, CO (US); Tyler Julian, Bothell, WA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 368 days.

(21) Appl. No.: 18/495,612

(22) Filed: Oct. 26, 2023

(65) Prior Publication Data

US 2025/0142352 A1    May 1, 2025

(51) Int. Cl.
*H04W 16/18*        (2009.01)
*H04W 24/10*        (2009.01)

(52) U.S. Cl.
CPC ........... *H04W 16/18* (2013.01); *H04W 24/10* (2013.01)

(58) Field of Classification Search
CPC ..... H04W 16/18; H04W 24/10; H04W 24/04; H04W 24/08
See application file for complete search history.

(56) References Cited

U.S. PATENT DOCUMENTS

| | | | | |
|---|---|---|---|---|
| 9,876,674 B1 * | 1/2018 | Murray | ................. | H04W 24/04 |
| 10,117,174 B2 * | 10/2018 | Kamijoh | ............... | H04W 24/02 |
| 10,237,775 B1 * | 3/2019 | Kokkinen | ............. | H04W 4/021 |
| 10,420,024 B2 * | 9/2019 | Abouelmaati | ...... | H04W 84/045 |
| 12,003,982 B2 * | 6/2024 | Medithe | .................. | H04W 8/08 |
| 2007/0211676 A1 * | 9/2007 | Sharma | ................. | H04W 16/18 |
| | | | | 370/338 |
| 2008/0207191 A1 * | 8/2008 | Fleenor | ................. | H04W 24/02 |
| | | | | 455/422.1 |
| 2011/0176598 A1 * | 7/2011 | Kohout | ................. | H04W 24/04 |
| | | | | 375/227 |
| 2015/0215927 A1 * | 7/2015 | Amirijoo | ............ | H04W 72/542 |
| | | | | 370/329 |
| 2019/0246329 A1 * | 8/2019 | Abouelmaati | ........ | H04W 24/02 |
| 2020/0379023 A1 * | 12/2020 | Cardozo | ............. | H04L 41/0622 |

(Continued)

*Primary Examiner* — Yuwen Pan
*Assistant Examiner* — Samuel H. Leonard
(74) *Attorney, Agent, or Firm* — Seed Intellectual Property Law Group LLP

(57)                ABSTRACT

Embodiments are directed to systems and methods for dynamically sensing and calculating the time remaining until a report of an interruption in cellular communications within specific areas must be made to an entity. Various regulations by different entities, whether the FCC, city, or state public safety organizations require reporting of cell phone outages according to their respective operational needs. The present embodiment provides techniques for dynamically calculating the time period remaining before reporting of an outage must be provided to a particular entity. A method is provided for receiving into the system the parameters for the regulation under consideration and an area of interest to be considered. The system will retrieve data from the various databases to determine whether or not the cellular service complies with the regulation under consideration. Calculations are dynamically made over time to determine if reporting under the regulation is needed.

20 Claims, 11 Drawing Sheets

(56)                    References Cited

U.S. PATENT DOCUMENTS

| | | | |
|---|---|---|---|
| 2021/0250245 A1* | 8/2021 | Li | H04L 41/0823 |
| 2021/0306891 A1* | 9/2021 | Blake | H04W 4/38 |
| 2021/0368380 A1* | 11/2021 | Verbulskii | H04W 36/305 |
| 2022/0051161 A1* | 2/2022 | Yan | G06Q 10/06375 |
| 2023/0164593 A1* | 5/2023 | Frangooles | H04W 24/04 |
| | | | 455/423 |
| 2024/0039780 A1* | 2/2024 | Agrawal | H04L 43/16 |
| 2025/0016664 A1* | 1/2025 | Sanmoogan | H04W 24/02 |

* cited by examiner

*NOC OUTAGE NOTIFICATION CALCULATOR* — 20

SITE LIST, COUNT, AND PSAP LIST MATRIX

| | | | | | | | | | | | |
|---|---|---|---|---|---|---|---|---|---|---|---|
| TOTAL PSAPs AFFECTED: 1,583 — 22 | | | TOTAL SUBSCRIBERS AFFECTED: 7,211 — 24 | | | TOTAL TOWERS AFFECTED: 15,884 — 26 | | | | | |

| AWS | PSAP NAME — 28 | FCC ID — 30 | PSAP ID — 32 | PSAP STATUS — 34 | CONTACT INFO — 36 | GNB ID — 38 | SITE ID — 40 | COUNTY — 42 | STATUS — 44 | STATUS — 46 | SITE STATUS |
|---|---|---|---|---|---|---|---|---|---|---|---|
| (ALL) ▽ | | | | | | | | | | | |
| NULL | 911-WASHINGTON DC-PSAP | 8160 | 110010003 | IN PRODUCTION | -- | 443017 | DCWDC00009A | DISTRICT OF COLUMBIA | DC | CX503 | |
| | | | | | | | DCWDC00015E | DISTRICT OF COLUMBIA | DC | MA295 | |
| | | | | | | | DCWDC00019A | DISTRICT OF COLUMBIA | DC | MA295 | |
| | | | | | | | DCWDC00023B | DISTRICT OF COLUMBIA | DC | CX503 | |
| | | | | | | | DCWDC00616A | DISTRICT OF COLUMBIA | DC | MA295 | |
| | | | | | | | DCWDC00855A | DISTRICT OF COLUMBIA | DC | MA295 | |
| | | | | | | | DCWDC00857A | DISTRICT OF COLUMBIA | DC | MA295 | |
| | | | | | | | DCWDC00981A | DISTRICT OF COLUMBIA | DC | MA295 | |
| | | | | | | | DCWDC00984A | DISTRICT OF COLUMBIA | DC | MA295 | |
| | | | | | | | DCWDC00988B | DISTRICT OF COLUMBIA | DC | MA295 | |
| | | | | | | | DCWDC00990C | DISTRICT OF COLUMBIA | DC | MA295 | |
| | | | | | | | DCWDC00991C | DISTRICT OF COLUMBIA | DC | MA295 | |
| | 911RCOG | 5401 | 390950005 | PENDING TESTING | 419-250-0048 | 157001 | DETOL00018A | LUCAS | OH | MA290 | |
| | | | | | | | DETOL00021A | LUCAS | OH | MA290 | |
| | | | | | | | DETOL00028A | LUCAS | OH | CX503 | |
| | | | | | | | DETOL00029A | LUCAS | OH | MA290 | |
| | | | | | | | DETOL00032A | LUCAS | OH | MA290 | |
| | | | | | | | DETOL00034A | LUCAS | OH | CX503 | |
| | | | | | | | DETOL00035A | LUCAS | OH | MA290 | |
| | | | | | | | DETOL00038A | LUCAS | OH | MA290 | |
| | | | | | | | DETOL00044A | LUCAS | OH | MA290 | |
| | | | | | | | DETOL00058A | LUCAS | OH | CX503 | |
| | | | | | | | DETOL00063A | LUCAS | OH | CX503 | |
| | | | | | | 157002 | DETOL00017A | LUCAS | OH | MA290 | |
| | | | | | | | DETOL00024A | LUCAS | OH | CX503 | |
| | | | | | | | DETOL00026A | LUCAS | OH | MA290 | |
| | | | | | | | DETOL00031A | LUCAS | OH | CX503 | |

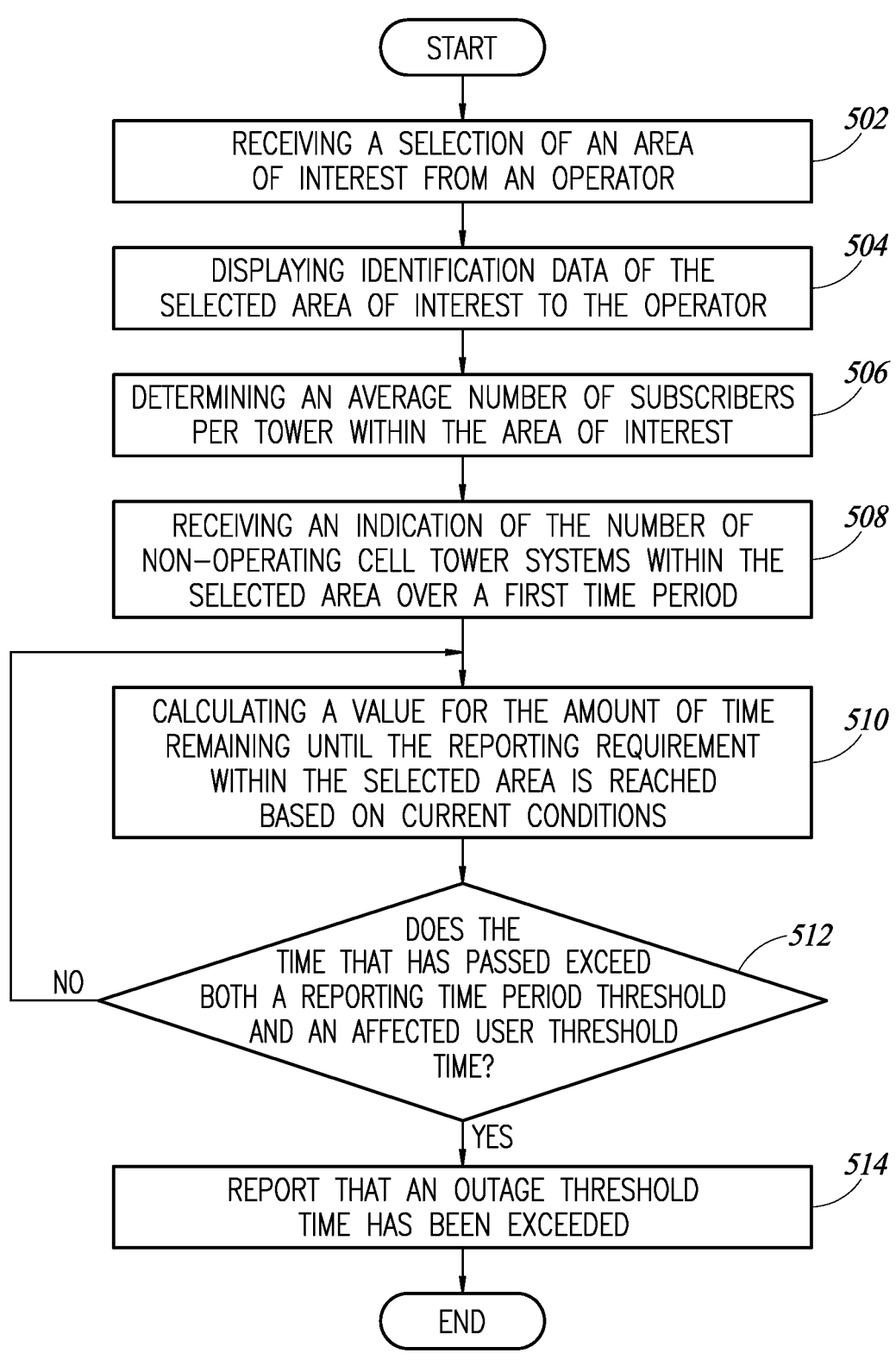

START

RECEIVING A SELECTION OF AN AREA OF INTEREST FROM AN OPERATOR — *502*

DISPLAYING IDENTIFICATION DATA OF THE SELECTED AREA OF INTEREST TO THE OPERATOR — *504*

DETERMINING AN AVERAGE NUMBER OF SUBSCRIBERS PER TOWER WITHIN THE AREA OF INTEREST — *506*

RECEIVING AN INDICATION OF THE NUMBER OF NON-OPERATING CELL TOWER SYSTEMS WITHIN THE SELECTED AREA OVER A FIRST TIME PERIOD — *508*

CALCULATING A VALUE FOR THE AMOUNT OF TIME REMAINING UNTIL THE REPORTING REQUIREMENT WITHIN THE SELECTED AREA IS REACHED BASED ON CURRENT CONDITIONS — *510*

DOES THE TIME THAT HAS PASSED EXCEED BOTH A REPORTING TIME PERIOD THRESHOLD AND AN AFFECTED USER THRESHOLD TIME? — *512*

NO

YES

REPORT THAT AN OUTAGE THRESHOLD TIME HAS BEEN EXCEEDED — *514*

END

FIG. 5

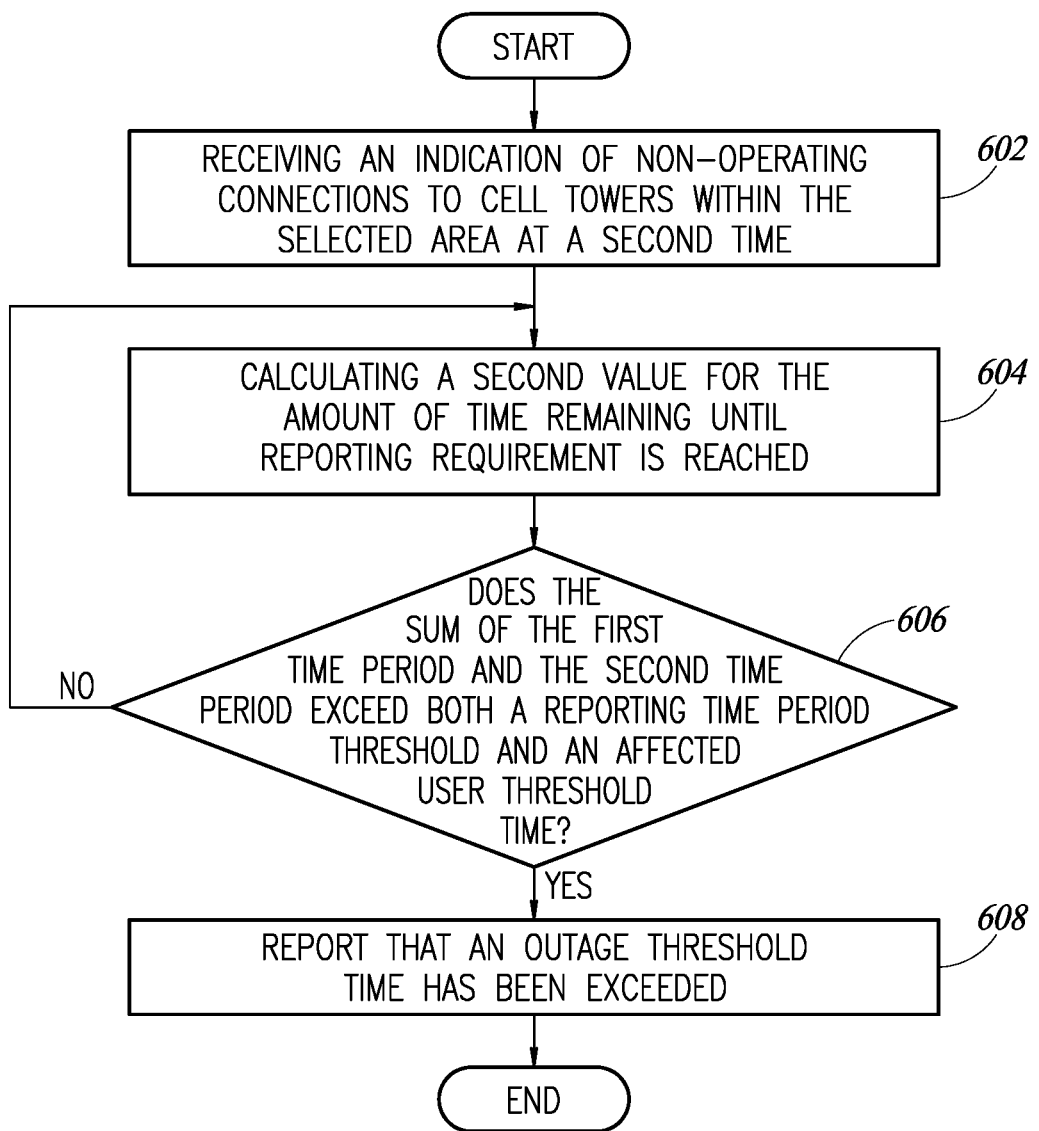

START

RECEIVING AN INDICATION OF NON−OPERATING CONNECTIONS TO CELL TOWERS WITHIN THE SELECTED AREA AT A SECOND TIME — 602

CALCULATING A SECOND VALUE FOR THE AMOUNT OF TIME REMAINING UNTIL REPORTING REQUIREMENT IS REACHED — 604

DOES THE SUM OF THE FIRST TIME PERIOD AND THE SECOND TIME PERIOD EXCEED BOTH A REPORTING TIME PERIOD THRESHOLD AND AN AFFECTED USER THRESHOLD TIME? — 606

NO

YES

REPORT THAT AN OUTAGE THRESHOLD TIME HAS BEEN EXCEEDED — 608

END

FIG. 6

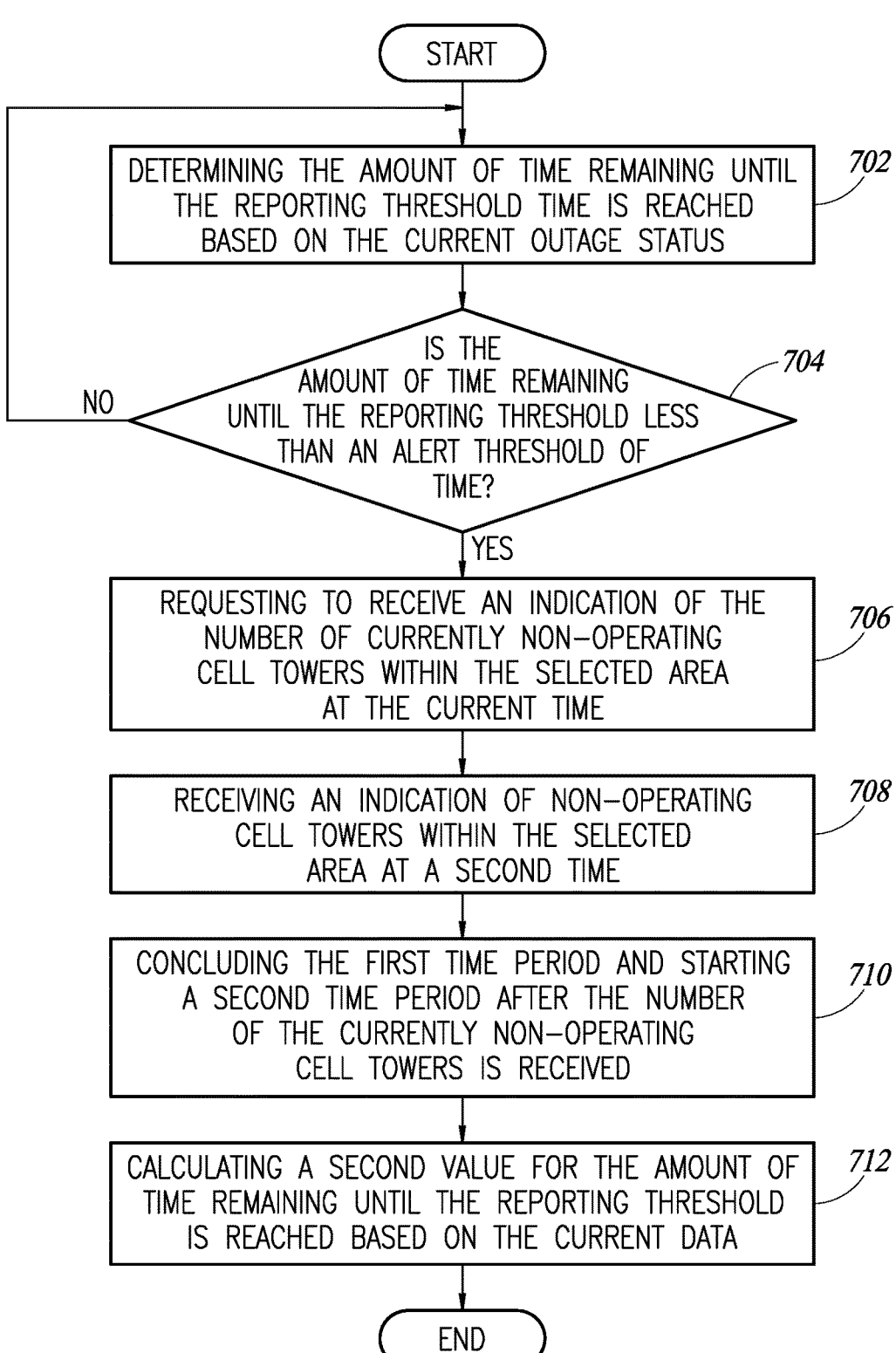

START

DETERMINING THE AMOUNT OF TIME REMAINING UNTIL THE REPORTING THRESHOLD TIME IS REACHED BASED ON THE CURRENT OUTAGE STATUS — 702

IS THE AMOUNT OF TIME REMAINING UNTIL THE REPORTING THRESHOLD LESS THAN AN ALERT THRESHOLD OF TIME? — 704

NO

YES

REQUESTING TO RECEIVE AN INDICATION OF THE NUMBER OF CURRENTLY NON–OPERATING CELL TOWERS WITHIN THE SELECTED AREA AT THE CURRENT TIME — 706

RECEIVING AN INDICATION OF NON–OPERATING CELL TOWERS WITHIN THE SELECTED AREA AT A SECOND TIME — 708

CONCLUDING THE FIRST TIME PERIOD AND STARTING A SECOND TIME PERIOD AFTER THE NUMBER OF THE CURRENTLY NON–OPERATING CELL TOWERS IS RECEIVED — 710

CALCULATING A SECOND VALUE FOR THE AMOUNT OF TIME REMAINING UNTIL THE REPORTING THRESHOLD IS REACHED BASED ON THE CURRENT DATA — 712

END

FIG. 7

DYNAMIC TRACKING OF REPORTING OF CELLULAR SERVICE OUTAGE AND METHOD OF OPERATION OF THE SAME

TECHNICAL FIELD

This disclosure is in the field of cellular phone communications, and in particular calculating the time for reporting outages of cellular service in a selected area.

BACKGROUND

As the use of smart phones and other cellular devices has increased, so too has the desire for more reliable, fast, and continuous transmission of content. Tracking areas where cellular service has been interrupted, predicting when it will be restored and understanding exactly which types of service were interrupted has value for a number of reasons. It is with respect to these and other considerations that the embodiments described herein have been made.

BRIEF SUMMARY

Embodiments are generally directed to systems and methods for dynamically sensing and calculating the time remaining until a report of outage of cellular service within specific areas must be made. In addition, embodiments are provided for dynamically revising the time remaining until an outage report must be made. The down time of cellular service that includes 5G or higher can therefore be tracked and reported to the local entities and reviewed by the service provider to improve the quality of service.

Various regulations by different entities, such as the FCC, city, or state public safety organizations require reporting of cell phone outages according to their respective rules. The present embodiment provides techniques for dynamically calculating the time period remaining before reporting of an outage must be provided to a particular entity.

A method is provided for receiving into the system the parameters for the reporting regulation under consideration. In addition, an operator may select an area of interest for comparison against the regulation under consideration. The system will retrieve from the various databases and obtain the data needed in order to determine whether or not the cellular service complies with the regulation under consideration. For example, the number of cellular towers, the number of users in the area, the average number of subscribers per cellular tower and other data is retrieved from the service provider's database based on the area of interest under consideration. The retrieved information is provided into the system and calculations are dynamically made over time to provide reports whether or not a regulation is being complied with and how much time is required until a report to the agency under consideration must be made. This information is dynamically updated over time based on how many minutes have passed since the outage within the selected area has been considered and how long it has been monitored. In addition, as the number of cell towers out of service is reduced, the system dynamically updates the amount of time remaining before a reporting is due under the regulation under consideration.

According to one embodiment, an operator selects when the system will transition from the first time period to start a second time period. After the selection is made by the operator, then the system will dynamically update itself to provide information to the operator regarding how much time remains before a report must be made for the operator's consideration. According to another embodiment, the system will monitor how much time is remaining before a report is to be made, and if the time is within a selected threshold, then the system itself will send a query to request data in order to start a second time period. These are two different methods by which the time period remaining until a reporting is required is dynamically updated. As various cell towers come back into operation and the number of non-operating cell towers is reduced, additional time periods can be started, such as one third, fourth, fifth or other time period in order to continue to dynamically monitor the amount of time remaining until a report must be made according to the regulations of an entity under consideration.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

FIG. 2 is a table showing the features being tracked within a selected service area.

FIG. 5 is a flow chart of the operation of the present method according to one embodiment.

FIG. 6 is a flowchart of the operation of the present method according to one embodiment.

FIG. 7 is a flowchart of the operation of the present method according to one embodiment.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
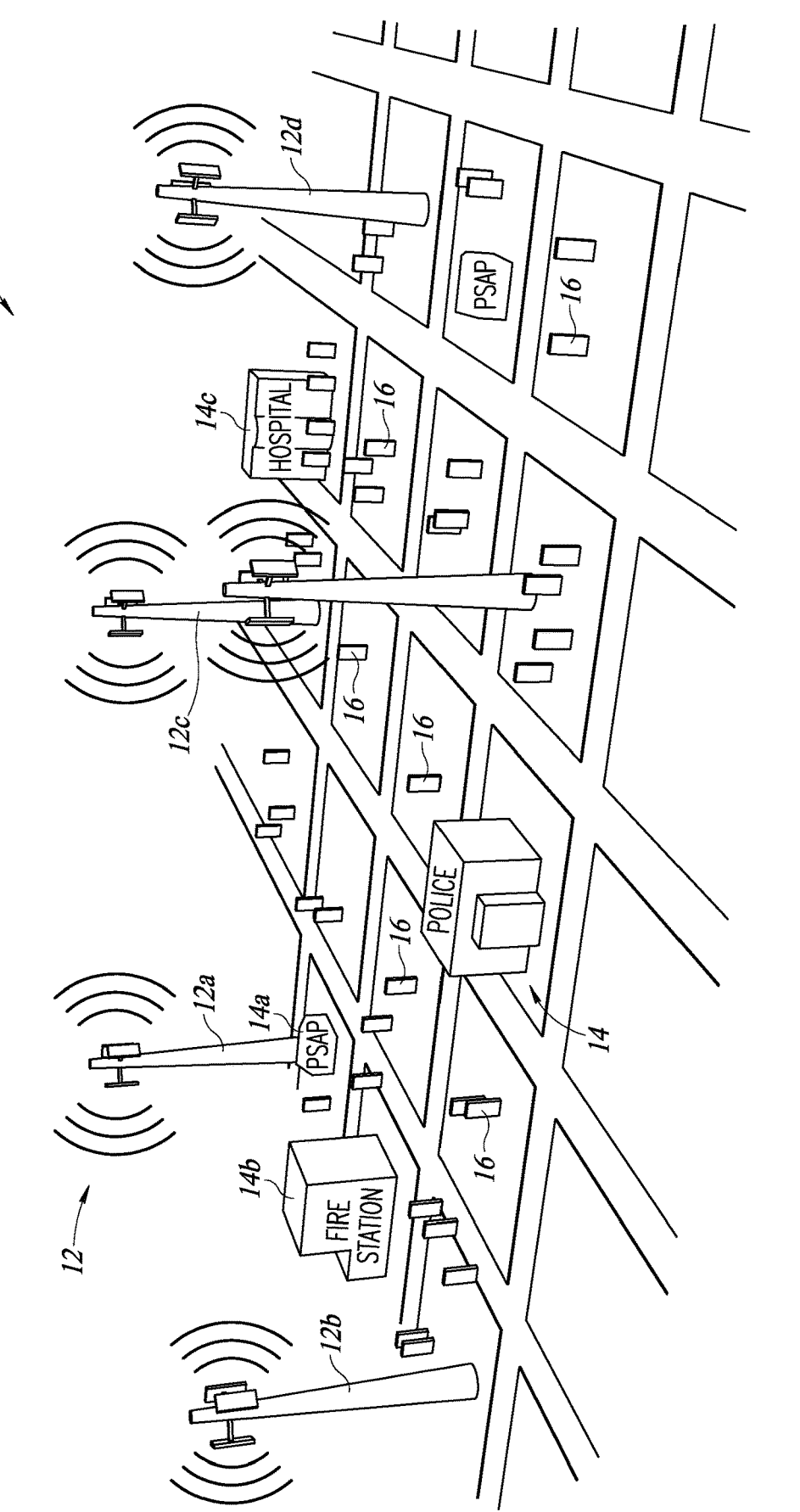
FIG. 1A illustrates a physical service area at a first time having a first set of cellular towers in operation and a plurality of users of cellular service.

FIG. 1A illustrates a selected area 10 in which cellular services are provided during a first time period. The area 10 includes a number of cell towers 12, which are respectively labeled 12a, 12b, 12c, etc. Within the service area 10 are a number of public safety organizations 14. These include one or more public safety answering point 14a (PSAP), a fire station 14b, a hospital 14c, as well as other public safety and government services. These may include a police station, hurricane and flood warning centers, health organizations, and other organizations directly responsible for personal and public safety. The PSAP 14a may include a 911 answering call center, and other access to emergency services. Also, within area 10 are a number of cellular subscribers that have cellular equipment 16. The cellular equipment 16 may include any electronics capable of exchanging information and data with the cellular towers 12 and include such items as a smartphone, smartwatch, a notebook, a pad or other electronic equipment with wireless communication capability. The cell equipment 16 is shown generally in the shape of a smartphone and can be at any location within the selected area 10. For example, it can be located in cars as they drive down the street, in various homes, inside one or more of the public safety organizations 14, such as within hospital 14c and many other locations. It is to be expected that some homes may have two or more of the cellular equipment 16 within the home. In addition, a single plan may have multiple subscribers and therefore multiple users of different cellular equipment 16 on the same plan.

Figure 1B:
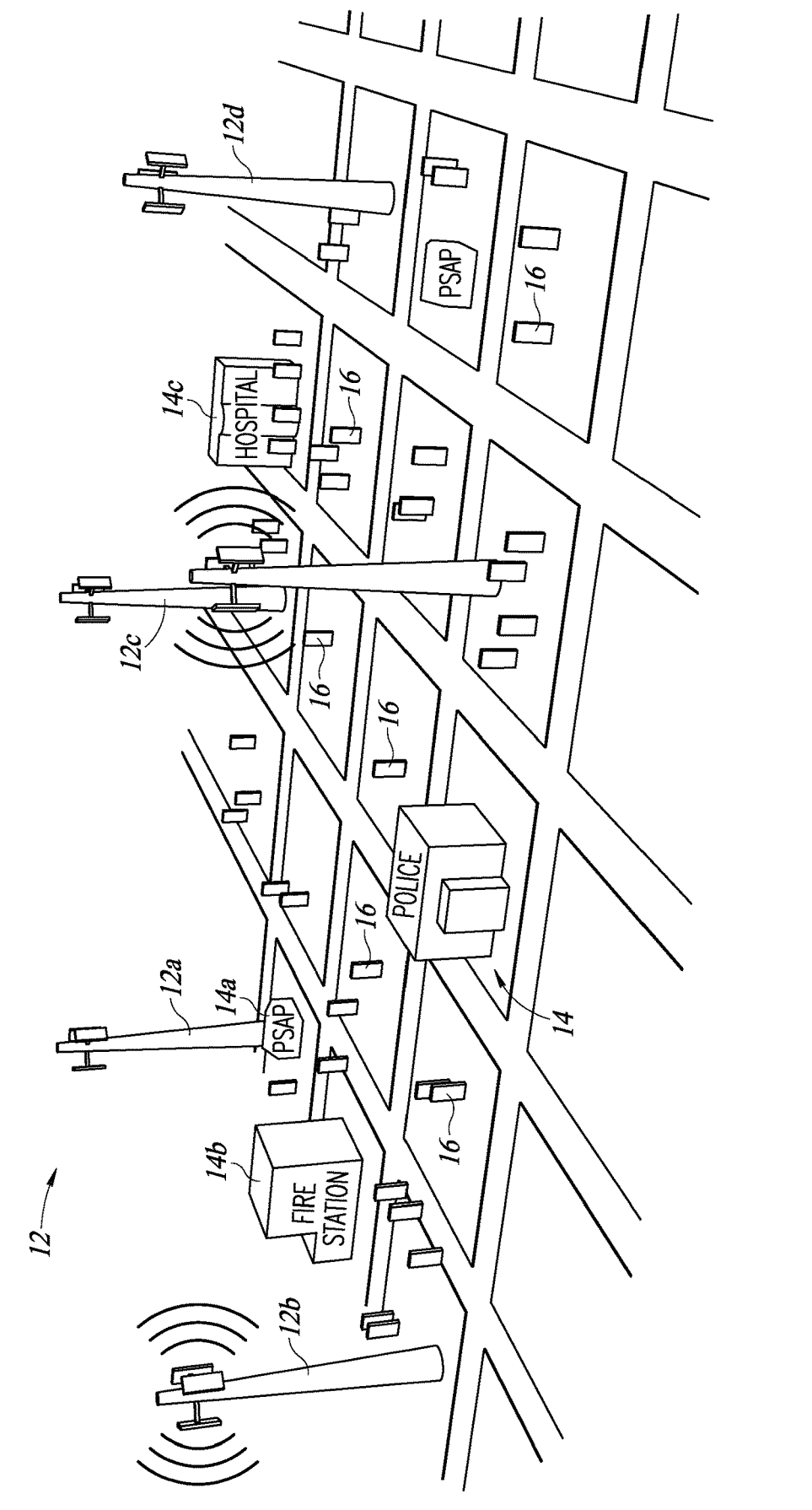
FIG. 1B illustrates the same physical service area as FIG. 1A at a second time having a different set of cellular towers in operation.

FIG. 1B illustrates an example in which three of the cellular towers 12 have gone out of service. In particular, cellular towers 12a, 12c and 12d have lost their signal as have all other cellular towers in that section of the selected area 10. When the cellular towers 12a-12c are nonoperational, then the subscribers that are within their wireless area lose access to cellular services and thus the ability to communicate with each other and the public safety organizations. In the example shown, when cellular tower 12a is out of operation then PSAP 14a also loses the ability to communicate with cellular communication. Similarly, when cell towers 12c and 12c are out of operation then the hospital 14c loses the ability to have cellular communication. The cellular communication will be lost both ways, for all subscribers that are attempting to reach the PSAP 14a and the hospital 14c as well as any subscribers who are inside the respective public safety organizations. In addition, many public safety organizations 14 will not have landlines. For those public safety organizations 14 which have landlines, they will continue have the ability to communicate with the outside via the landline. However, many public safety organizations rely exclusively on wireless communications and do not have landlines, accordingly when the cellular communication is disrupted then the respective public safety organization cannot communicate with organizations outside of itself.

In some parts of the selected area 10, some cellular towers, such as 12b will remain in operation and therefore continue to provide service to those subscribers and public safety organizations that are within their wireless range. For those cellular towers 12b that remain in operation, services are provided within the selected area 10 for those subscribers making use of the cellular equipment 16 within the wireless range of the cellular tower as well as for the public safety organization, such as the fire station 14b that is within the cellular range of tower 12b.

As can be appreciated, some subscribers and public safety organizations within area 10 might have service from more than one cellular tower 12. For example, the fire station 14b is within the coverage area of both tower 12a and 12b. Accordingly, if either cellular tower 12a or 12b is operational, the fire station will have cellular service. On the other hand, PSAP 14a has cellular access only through tower 12a and, hospital 14c has cellular access only through tower 12c and 12d. Thus, even though hospital 14c has access through two cellular towers, since both towers are down, it has lost cellular service for communication to and from the hospital 14c as well as all subscribers that are unique to this area served by towers 12c and 12d.

When there is an outage of cellular coverage over a large area, this can cause significant disruption of public safety as well as other services within the outage area. Subscribers cannot contact 911 call centers and in addition, some emergency services and public safety organizations 14 are not able to communicate regarding their current situation and needs. Accordingly, it is required to closely monitor and report any outages that affect such public service organizations 14. At the current time, various organizations have rules regarding when an outage must be reported to respective agencies. The FCC has a number of requirements regarding the reporting of outages of cellular services that would prevent operation of certain public service organizations. As just one example, current FCC regulations require a reporting from all cellular service providers if service to a 911 call center is disrupted for a selected period of time. According to some regulations, the selected period of time might be 30 minutes, while according to other regulations it may be as short as five minutes or even three minutes. As can be appreciated, these regulations will change based on the federal organization, such as the FCC or a public safety organization or, respective local public services such as a state or county public safety organization.

The various suppliers of subscription services are required to report any outages that meet the reporting requirements of that particular regulation and that particular organization, whether the FCC, 911 call centers, sheriff's departments, city safety departments, counties or the like. In order to comply with the various laws and regulations in different areas and jurisdictions, it is important that the cellular providers know the regulations in each local area and in addition, have various tools in order to identify outages, know when they started, and be alerted if the outages are of a type that must be reported.

The present disclosure provides a number of tools as well as various hardware and software to ensure that the cellular provider can abide by the regulations, both federal and state, county, local and other regulations for reporting any outages. Various examples of these tools will now be provided according to the present disclosure.

A first step in complying with the reporting rules in a jurisdiction is to properly understand the number of plan subscribers within each selected area and also to know the number of cellular equipment in operation, which includes knowing the number of users on each subscribers plan. In addition, it is beneficial to be able to know for which public safety organization such service is to be monitored and reporting to be made. According to one embodiment of the present disclosure, the number of subscribers within any area which the operator wishes to select may be determined. There is no boundary that is artificially present in the areas which can be selected for the area 10. Specifically, within each area 10 there will be a physical address for the location of each subscriber, which may be a billing address, as well as an address at which the equipment is present at certain times. As can be appreciated, the cellular equipment used by each subscriber can move such as when the subscriber in a particular home travels via car to a new location and according to one embodiment the tracking can stay based on the home address of this subscriber or according to another embodiment, the tracking can follow the actual location subscriber based on geo-tracking available within each specific uses equipment.

One potential technique is to sort the subscribers according to the ZIP Code and to also track and store the ID of all cell towers within a particular ZIP Code. The service provider will have available in a first database the billing address of each subscription contract and therefore will know the ZIP Code within which each subscriber is based. In addition, they also have available a database of all cell towers within each ZIP Code. As can be appreciated, a single ZIP Code may have between a few and several hundred or thousand cellular towers. It is possible for the selected area 10 to represent a single ZIP Code or, numerous ZIP Codes depending on the area selected by the operator. It is also possible for the operator to select an area using different criteria than ZIP Codes. For example, an entire state can be selected for an area, a county, city, town or other division for the area. Since the service provider knows the physical address and coverage area of each cellular tower it operates, it is possible for an area to be based on a single tower and the area serviced by that tower.

Figure 3:
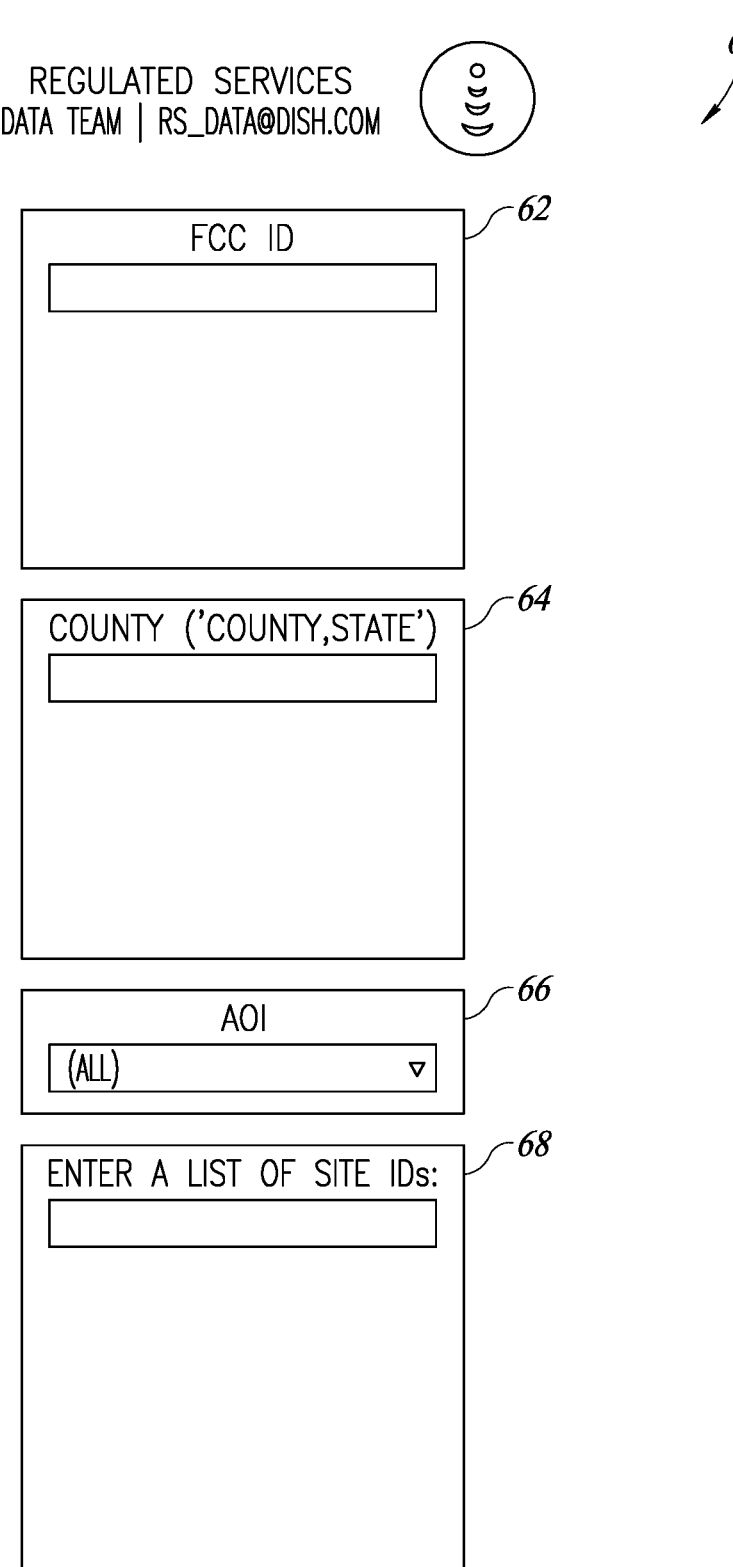
FIG. 3 illustrates menus for operator input for the features of FIG. 2.

Viewing together FIGS. 2 and 3, illustrated are different selections an operator can make in order to select an area for consideration. Looking first to FIG. 3, a menu 60 is provided for an operator to select an area of interest to be reviewed. For example, the operator can input an FCC code for a certain area that the FCC wishes to have monitored. This area can be of any size, for example the entire country, a selected state, a portion of one state, a group of several states or any area that the FCC has designated with that particular area identification number. The operator can input the FCC area into menu item 62 in order to select that area for which data is to be collected. Menu item 64 permits an operator to input a state or county as the area of interest. Menu input 66 permits the user to select a number of different choices for the area of interest 10. For example, it can select according to any number of ZIP Codes, it can select a city, or any other organization that is recognizable. Menu 68 permits the input of one or more cellular towers for their site ID. As can be appreciated, each cellular tower 12 has a particular ID, associated with that cellular tower. Accordingly, in menu 68 the operator can input one or more ID codes for a particular cellular tower or particular servicer of operation and thus monitor a particular area.

The areas of interest available in menu 66 provide a variety of choices for the operator. For example, the area can be one or more PSAPs 14*a*. For example, the user may select a particular 911 call service center, or a group of 911 service centers. The operator may also select a group of public safety organizations 14, such as fire stations 14*b*, police or hospital stations and other organizations. Accordingly, menu option 66 provides a wide variety of criteria by which the area of interest 10 can be selected. This has particular benefits within the present disclosure because an operator is permitted to make fine tune reporting to the organization, whether a local city, county or the FCC regarding cellular service outages. The ability to provide granular and operator-selected areas of interest is a particular benefit according to the present disclosure.

Once an area of interest 10 is selected whether through menu option 62, 64, 66 or 68 the database of the system is examined to retrieve the ID of all cellular towers within the area of interest 10. Thus, if a county is selected then the system provides, through a database retrieval, the ID for all cellular towers 12 within the area of interest as well as information regarding the number of subscribers within the area, as well as the average number of subscribers for each cell tower within the area selected.

FIG. 2 illustrates a report that can be provided based on the menu selections of FIG. 3. As shown in FIG. 2, a graphical user interface 20 (GUI) provides the operator information about the areas which have been selected such as the total number 22 of all PSAPs within the selected area. In the example shown, there are 1,583 PSAPs within the selected area. In addition, in this example, the total number of subscribers 24 within the area of interest is 7,211, as well as the number of towers 26 within the selected area is 15,884. As can be appreciated, these numbers are for illustration only and it would be expected that substantially more subscribers may be present, as well as fewer or more towers depending on the area selected and the service window areas.

The graphical user interface (GUI) also provides an ID report by name of PSAPs in column 28, the FCC ID code in column 30, the PSAP ID code in column 32, the PSAP status in column 34, as well as contact info in column 36, and various ID codes in column 38. Column 40 can provide the site ID of the individual cell towers within the area of interest 10. The county can also be provided in column 42 as well as the state in column 44, and even the specific ID for particular groupings or other areas of site identification can be provided in column 46. For example, column 46 can provide a report of the last three digits of ZIP Code or other site identification status for the area of interest. The columns 28-46 provided are just some examples of the data that can be made available to the operator.

FIG. 2 shows two separate areas of interest, in the first example grouping 27*a* an area within the District of Columbia has been selected, and in the second grouping, an area in Ohio has been selected. In the area 27*b*, the area of Lucas County, Ohio has been selected, which includes Toledo, Ohio, an area bordering Lake Erie and south of Detroit along the border between Ohio and Michigan.

After an area of interest has been selected, reports are obtained regarding the status of cellular service within the selected area. A cell tower can provide radio service within a selected area and has a site ID. Each cell tower can be considered a radio access site (RAS) which provides reporting regarding its status through numerous databases. There are separate reports available in separate databases regarding the status and operation of each RAS, namely each cellular tower or each access point within the cellular network. In some embodiments, the RAS that provides access to the cellular service may be a satellite, such as a low Earth orbit satellite that is orbiting the Earth at a selected speed. Thus, while the examples provided describe the cellular tower as one of the sources for cellular service coverage, it can be appreciated that any number of sources can act as the cellular provider and reports are available on each cellular provider regarding its status of operation. These separate reports are available from different databases which are not described here since they are known in the art. The status of each respective radio access point, such as cellular tower, microcell, satellite or other access point is available on an instantaneous basis and can be obtained.

According to various regulations, the outages are reported to different agencies. For simplicity of explanation, an example is provided for an FCC requirement regarding reporting of service to PSAPs within a selected time period and also based on the potential users of that PSAP. As can be appreciated, the reference here to the FCC requirement for reporting outages within a PSAP service area is just one example and similar principles, as taught herein, can be used to comply with the regulations which may be available or issued from any county, state or other agency. In addition, there may be new FCC regulations as well as regulations from the FAA, various PSAP organizations that require reporting of outages, accordingly, the present disclosure is very flexible in being able to track and adapt to any outage reporting that might be required from any regulatory body, organization that wishes reports or the like. The graphical user interface 80 which is provided herein is custom for the notice of outage from the FCC notification calculator, however, according to principles taught herein, it can be adapted for any type of regulation from any body or reporting which is to be tracked.

According to the particular example of one set of FCC regulations, reporting is required within a selected time period if cellular coverage within a PSAP 14a service area is disrupted for a selected period of time. This may be in the range of 30 minutes, 10 minutes, 3 minutes or any time selected by the FCC regulations. In addition to the time limit on outages, the FCC also has reporting regulations if a certain number of subscribers are without coverage for certain period of time. This is a separate requirement which may be in addition to, or in combination with the reporting requirement for outage within a PSAP area. The present disclosure provides reporting for different types of outages according to different criteria as will now be explained.

Referring to FIGS. 4A-4D a selected area is monitored based on an example outage provided for the present disclosure. According to this present example, the FCC regulation which applies to total users within a selected area is the criteria being monitored, namely, the FCC has a regulation regarding the potential affected user minutes for an outage. This is a combination of the potential users within an area such as the number of subscribers that maybe within an area as well as the number of minutes that the outage occurs. According to one set of FCC regulations, if the potential affected user minutes (PAUM) exceeds 900,000 in a selected area of a given size then reporting must be made of the outage to the FCC as well as other agencies. In addition, according to further parts of the regulation, if the duration of the outage is longer than 30 minutes then reporting must be made. According to one set of regulations, it is required that the outage both exceed a selected time period, for example 30 minutes, and also that the PAUM exceed a selected time period. In the example provided, the regulation being considered is that with respect to the PAUM count which states that reporting is required to the FCC, if the PAUM exceeds 900,000 in the designated selected area and also lasts longer than 30 minutes. Both criteria must be triggered in order for an outage to be reported to the FCC. As can be appreciated, other regulations which require report based solely on the time of the outage, for example a selected time period such as 15 minutes in which a 911 call center in a PSAP 14a is without cellular service, and such reporting also falls within the scope of the present disclosure even though the example provided is for the PAUM regulation of the FCC.

In FIGS. 4A-4D, the present embodiment will illustrate complying with the PAUM reporting requirement of the FCC as one example of the tracking of outages according to one set of regulations, but the same techniques and algorithms can be used for other types of reports, such as those required by local police or hospital districts, 911 call centers, city, county or state regulations or the like.

Figure 4A:
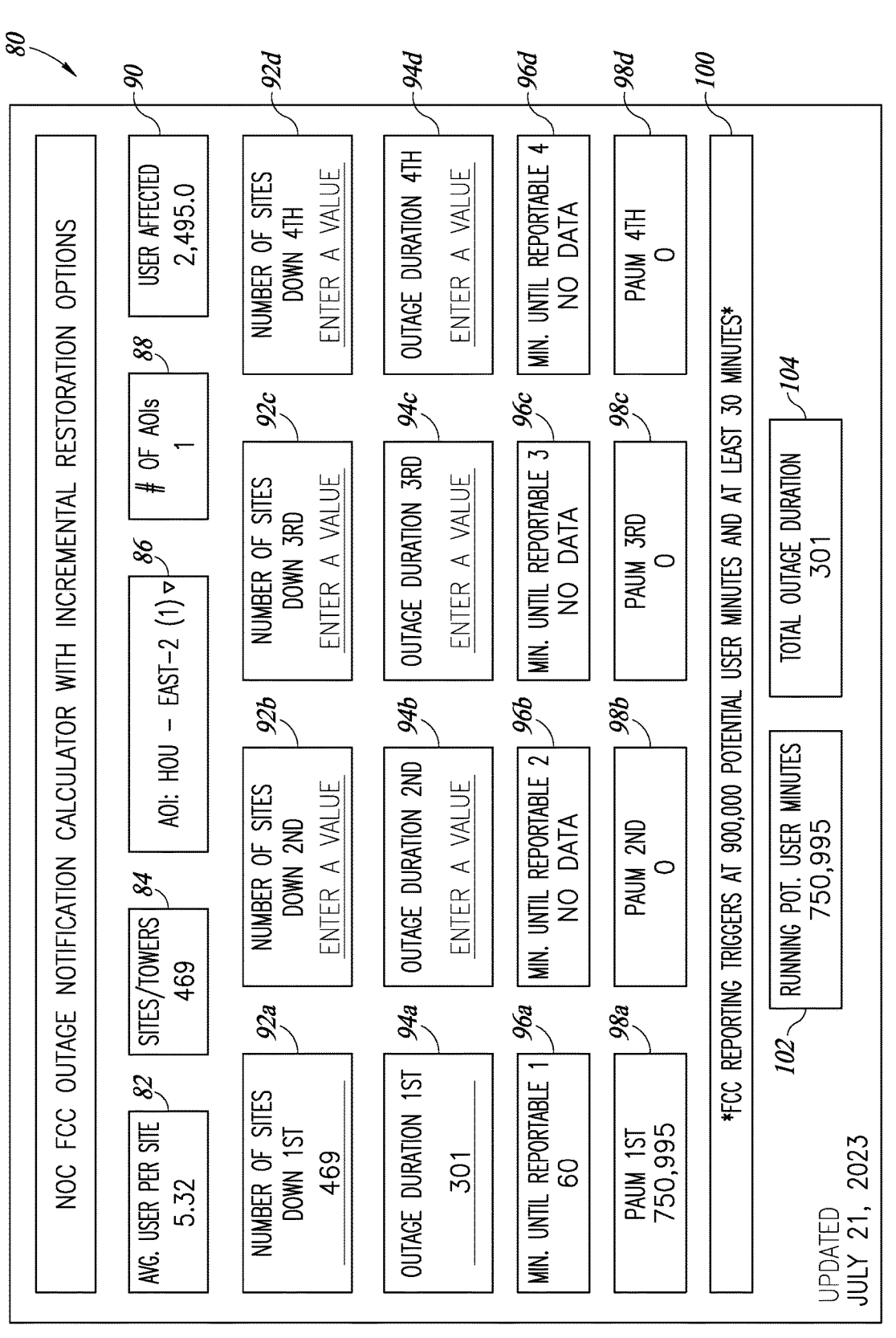
FIGS. 4A, 4B, 4C and 4D each illustrate a graphic user interface providing an output of an potentially affected user minutes and time for respective different selected periods of time.

Turning now to FIG. 4A, an area that has been selected as the area of interest 10 is shown in item 86. In this example, the area of interest 10 is an eastern section of the city of Houston, as can be seen viewing block 86 in FIG. 4A. Once the area of interest is input, then other data will be provided within the graphical user interface by retrieval from the database based on that area of interest 10. For example, the selected area of interest in this particular example has the number of potential users that might be affected shown in block 90 as 2,495. This area has 469 cellular towers as shown in block 84 and there is an average of 5.32 users per tower shown in block 82. As can be appreciated, these numbers are provided for illustration only and in actual operation, there will be significantly more users for this number of towers, again depending on the size of the area which is selected. Some areas may have only a single tower and, thus, relatively few users whereas other selected areas may have several thousand towers.

After the area of interest 10 has been selected, the operator receives from a different database the report of the status of all cellular towers within the area of interest. If even a single tower is down within the area of interest, this is reported and available to the operator and to the system. The operator can then check the system and make a decision whether the number of towers that out is sufficient to start the use of the system that will provide a timing for when a report is sue to a regulatory body. By providing the data to an operator, they can make the decision whether that particular outage, based on the location of the area, the size of the area and regulations within that particular area warrant the need to start use of the present system that will provide a time to make a report to a regulatory body. In one alternative, the outage data is provided directly to system and it starts to track a reporting period without intervention or assistance from an operator. According to one embodiment, the operator enters, or a different tracking database provides directly and automatically to the system, the number of towers 12 that are down within the area of interest in block 92a. In this particular example, there has been a general outage in the entire area. This may occur if an entire power station is down and therefore all 469 towers 12 within the area selection are out of service. Further, the outage duration is long-term as may occur such as when a hurricane, tornado or other natural catastrophe affects an area. In this example, the outage duration is 301 minutes, see block 94a showing the number of minutes that the duration has lasted. As can be appreciated, if the duration continues the number in block 94a will increase, according to one embodiment, it will automatically increase because data is provided directly from the reporting service via software link into the database shown in FIG. 4A. According to other embodiments, an operator will enter the outage time as reported from the different databases available to the operator. Based on the number of sites that are down as shown in block 92*a* and the duration as shown in block 94*a* then the PAUM is calculated as shown in block 98*a* in this example 750,995. For this particular FCC regulation, this will show the running total of the potential affected user minutes in block 102 in this example 750,300. Reporting is required if the PAUM exceeds 900,000. Accordingly, a calculation is generated showing the number of minutes remaining for this particular set of circumstances before an outage must be reported to the FCC under this regulation. Block 100 shows the particular regulation which is under consideration for this example for this graphical user interface 80. Particularly, as stated in block 100, the FCC reporting is triggered if there is an outage of over 900,000 potential user minutes and if the outage has also lasted at least 30 minutes. For this, graphical user interface 80 will be shown in block 100 so that the user is alerted to the criteria being considered.

As shown in block 96, there is an indication that the current outage rate for the number of towers and number of users within a tower that after 60 more minutes a report must be made to the FCC regarding the outage. Therefore, the operator viewing the interface 80 is now aware that 60 minutes remain before a report must be made. This provides significant value to the operator as well as to the service provider regarding their compliance with various FCC as well as local and state regulations.

Figure 4B:
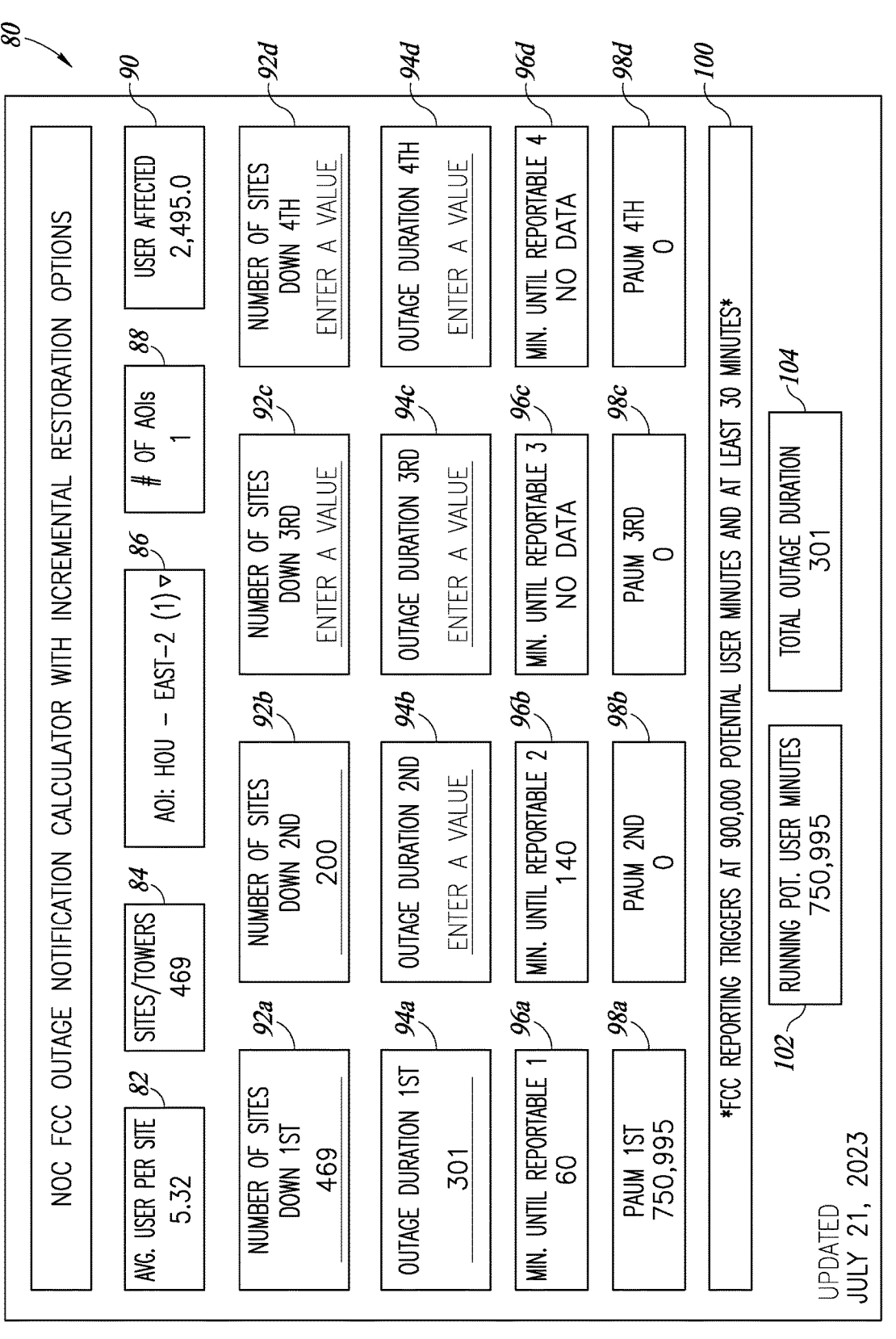
Figure 4C:
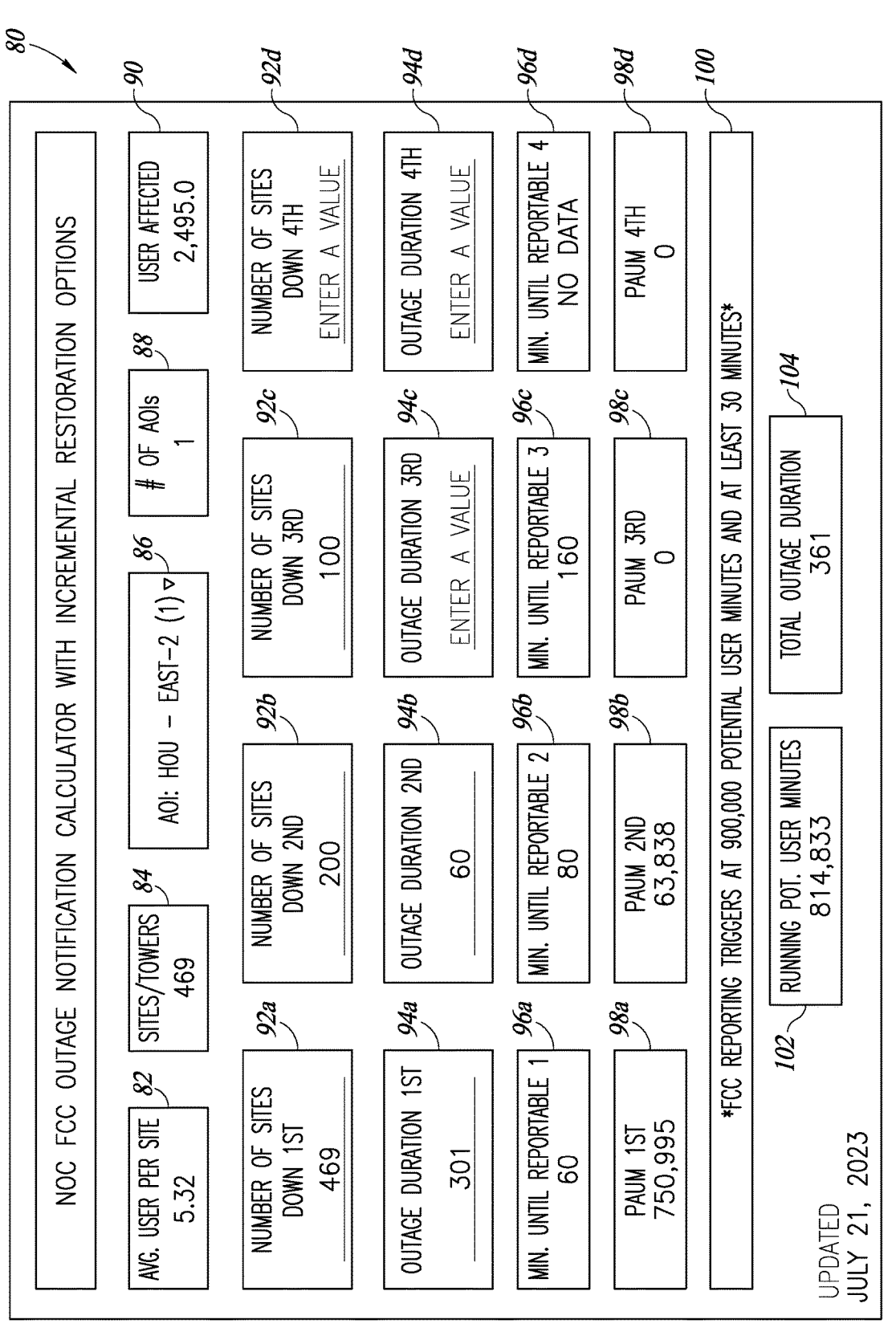

The example shown in FIG. 4A is for a first selected period of time of the area of interest 10. The time period shown is for 301 minutes. As time passes, cellular towers will be repaired and more and more will come back online as power is provided and they provide wireless service to the area. After the first time period is past, in this example 301 minutes, a second selected time period occurs in which fewer cell towers are out of service. At a second selected time, 269 of the towers have come back into service and there remains 200 towers out of service as shown at block 92*b*. Since more coverage is provided and fewer potential users are out of service, then the number of minutes until reporting is required has increased from 60 minutes to 140 minutes, see block 96*b*. Namely, since the number of users without service has gone down, the running PAUM is now lower. In the example shown in FIG. 4B, the number of reportable minutes has been updated, however, the PAUM and total duration has not been updated since the outage continues and the duration of the second outage is not yet known. Thus, the point in time shown in FIG. 4B is exactly at the moment in which the second time period starts and the duration of the second period remains in zero, with the value shown in block 94*b* being zero or open to receive a value. According to a first embodiment, an operator can manually enter the duration of the second time period. In 94*b*, a connection can be provided from the outage reporting service that shows automatically the number of minutes that the outage has been present for the 200 towers being reported during the second time period, thus, after the second time period exceeds a minute then the value will be entered into block 94*b* and further calculations can be carried out to track the PAUM and reported in block 102 and also update the total outage duration in block 104. This is shown in FIG. 4C in which the duration of the second outage was 60 minutes. During those 60 minutes, the time during which an outage had to reported decreased from the starting value of 140 minutes down to 80 minutes as the outage continued. The PAUM of the second period was 63,838 as shown in FIG. 4C so that the total PAUM during the second period as shown in block 102 and the total outage is now 361 minutes that has been endured for the 200 towers. At a third selected time period as shown in FIG. 4C, another 100 towers have been repaired and a third time period starts so that the second time period is now concluded and the duration 60 minutes is known. During the third time period, 100 towers remain out of operation and the outage duration for the third time period has started at zero and will increase with each minute. Accordingly, the value shown in FIG. 4C is zero and is waiting to receive an input, either from a report that is provided automatically from the database or input from an operator.

As can be seen in FIG. 4C since only one hundred sites are now out of service, the minutes remaining until reporting is required has now increased 260 minutes. Just prior to the start of the third time period the amount of time until report is needed is 80 minutes, but because more towers have been repaired and are back in service, the time period is now at 160 minutes.

The selection of a time to transition from the first selected time period to the second selected time period can be based on a number of different embodiments and options. According to a first option, an operator is receiving reports of the number of cellular towers 12 that remain out of service within the selected area. In one embodiment, the operator can select to end the first time period and input the number of sites now out of service into block 92*b* in order to start the second time period and end the first time period. This is an operator selection based on the operator obtaining data from various reporting services available. According to a second embodiment, the database on which the present system is operating can be receiving updates via various sources, such as databases that contain the amount of power and outages in various areas as well as the number of cell towers that are in operation and those that remain out of operation. This can be provided on an individual tower basis to the system and automatically entered into blocks 92*b*, 92*c* and 92 on which the graphical unit interface shown in FIG. 4A is operating. According to the automatic entry embodiment, after a selected threshold number of towers have been repaired, for example 50 towers, or 70 towers, then the selected first time period can be ended by the system and the number of sites which remain out of operation can be updated automatically in block 92*b* so that the first time period is concluded and the second time period ends. Thus, this time period can be triggered and started by a threshold number of radio towers that have come back in operation. This change from one time period to the next can continue for blocks 92*c*, 92*d*, etc.

The threshold number can set at some percent, such as 10%, 20%, 30% of the towers now back in operation, or an actual number, for example 20, 30, 50 or any selected number of towers now back in operation. The operator can select and then set the trigger to move to the next time period, whether a threshold percentage of towers that were originally down that have come back in operation, an actual number or other criteria, or, it can be preset in the system to be a default to some percent and operator selection is not needed and the default value will be used. An operator will often have the additional information about the type of outage, the regulation under consideration, the area of the outage, the location of the outage and other details that would assist in selecting a time to end the first period, whether by operator selection, default threshold or a custom threshold set by the operator.

A third embodiment by which the first time period can be ended is based on monitoring the number of minutes remaining until the outage must be reported. In particular, in the example shown in FIG. 4A after 301 minutes there was 60 minutes remaining until an outage was reportable to the FCC. As can be appreciated, the service provider prefers to maintain sufficient service quality rating that a report to the FCC of a major outage is not required. Accordingly, the number of minutes remaining until an outage must be reported can be monitored by the operator or by a software flag. A threshold can be set, for example, if the reporting time is less than one hour from which a report must be made, then this can trigger a request to be output by the present system according to the disclosure in order to go retrieve a report of the number of sites that have been repaired and the number of sites that remain down. Namely, based on a threshold number set for the remaining minutes before reporting is triggered, the system can send out a query to a database requesting to know how many sites remain down and the total area that they cover so that the first time period can be concluded, and the number of down sites can be updated and the second time period can be started. This can operate without user or operator input according to this embodiment. As can be appreciated, if the number of sites that are down is drastically reduced then the PAUM will decrease rapidly. Thus, if the number of minutes is within a threshold of being reported, in this example 60 minutes, then the system will be triggered to retrieve from another database the number of cellular towers 12 that remain down in the selected area. In the example shown, 200 remain down and this will be input from the outside database and then the new time before a report is provided will be 140 minutes as shown in FIG. 4B and, thus, the time is dynamically reset. Accordingly, a dynamic monitoring is provided regarding when a reporting must be made to the FCC regarding this regulation for reporting an outage.

Continuing with the third embodiment, the time until an outage must be reported can be maintained at the same value for the second reporting period or it can be a different threshold. In one embodiment, both are the same threshold, for example, 60 minutes before a reporting is required or the second time period can have a lower threshold, for example, 30 minutes or a higher threshold, for example 80 minutes in the example shown. Namely, after 80 minutes has passed, the system will automatically retrieve from a database the number of sites that are down at that particular point in time. This will cause the termination of the second time period and the start of the third time period showing 100 towers remain down and the number of minutes until reporting is required is now 160 minutes as shown in FIG. 4C. Accordingly, the reporting period is dynamically updated as well as the PAUM and the total duration of the outage.

Figure 4D:
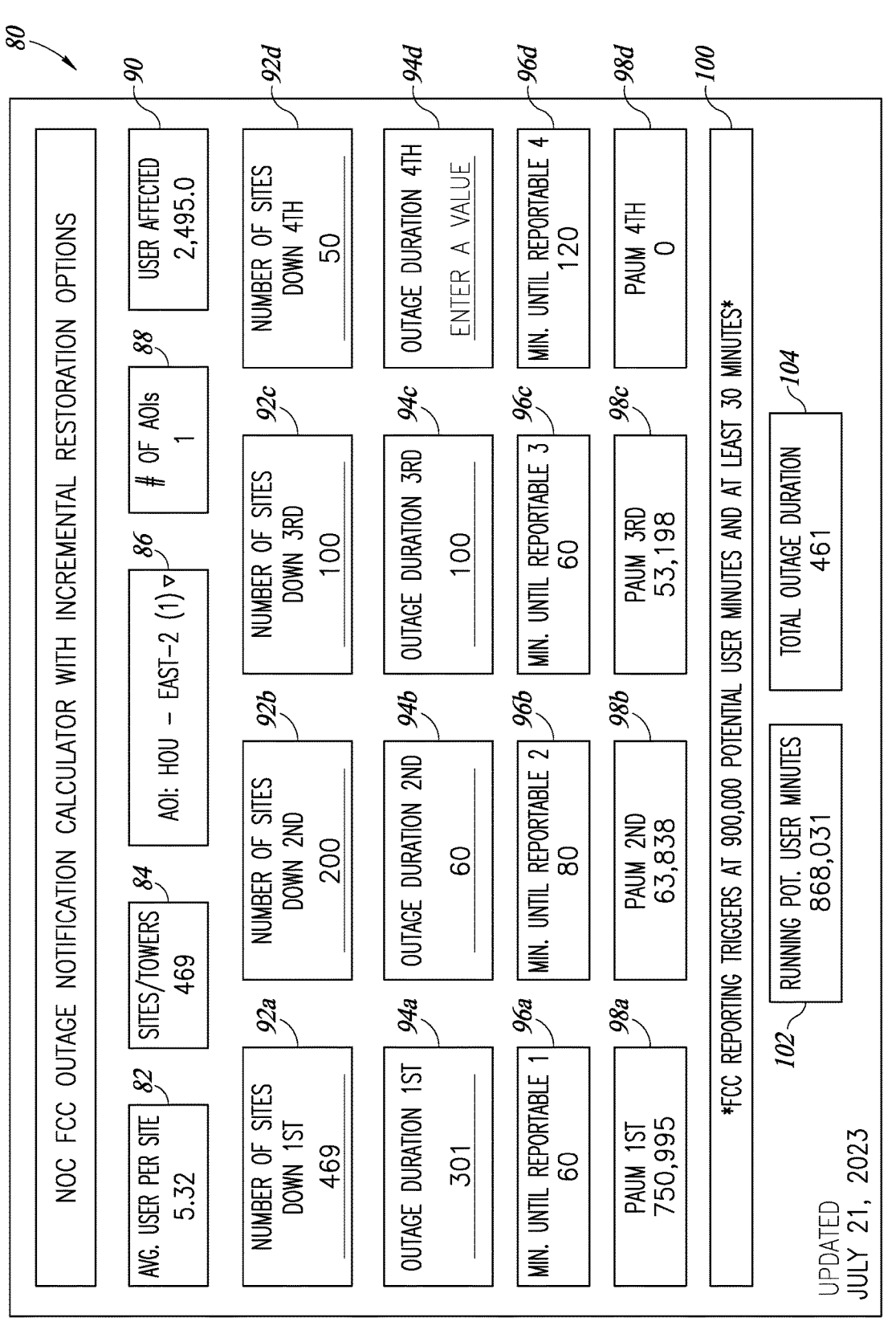

FIG. 4D shows the conclusion of the third time period and the starting of a fourth time period. The third time period lasted for 100 minutes and continued until the time for which a report was due was within 60 minutes. Then, according to one of the embodiments described herein whether operator choice, a report based on the number of cellular towers that had been repaired, or a threshold trigger such as 60 minutes until reporting was due the system obtained an updated number of the cellular towers 12 that were down. In this example, 50 towers 12 have been repaired and 50 towers remain down at the start of the fourth period and the outage duration is zero since the fourth period has just started. Since only 50 towers 12 are down, the minutes remaining until a report is due is 120 minutes. In addition, the data in block 102 has been updated to a PAUM of 868,031 and a total outage duration of 461 minutes issuing a block 104. The operation of the system continues until the outage is finished and sufficient cell towers are in operation that no outage is considered present within the selected area. As can be appreciated, one or more towers may always be out within a selected area 10, however since there is significant overlap in coverage this may not result in loss of any service to any users. Namely, if only one or two cell towers are out, and they are spaced far from each other there may be sufficient cell towers and service that there are no potential affected users within the loss of coverage area. Accordingly, the outage area is considered zero because no users are without service.

As also will be appreciated, since the reporting criteria for this particular FCC regulation is 900,000 PAUM and in addition combined with the duration in excess of 30 minutes, if only a few users are out of service, then it may be several days before reporting is required. On the other hand, if there is a relatively large area, and depending on the number of users and towers within the area, reporting may be required at the 30 minute time.

The operation of the present system will now be described with respect to various flowcharts as shown in FIGS. 5, 6, and 7. Turning first to FIG. 5, at the start of the operation, the system receives a selection of an area of interest from an operator, step 502. Afterwards, an identification of the selected area of interest is displayed to the operator, step 504. This display can occur in the interface shown in FIG. 2 or it can be shown in the interface shown in FIG. 3. In addition to the GUI of FIGS. 2 and 3, the operator may have on one screen the interface available in FIG. 4A showing the area of interest. After the area of interest has been indicated by the operator, then the system refers to the database to determine the average number of live subscribers per tower within the area of interest, step 506. This includes performing a number of calculations and accessing a number of databases in order to determine the number of towers within the area of interest, the total number of subscribers, and other information such as the number of user equipment with each service plan and the like. Next, a report is obtained of the number of non-operating cell towers within the selected area at a first time, step 508. Further, the time is started at a selected time so that a time period is monitored during step 508 based on the number of cell towers out of operation spanning the first time period. As more minutes accumulate in the first time period, a calculation is done at the amount of time remaining until the potentially affected users within the selected area exceeds the PAUM of the particular regulation under consideration, step 510. Monitoring of the PAUM continues for a selected time period as shown in block 512 to determine whether or not the threshold has been exceeded according to the FCC regulation or, the appropriate regulation being considered. In the example provided of the PAUM report due to the FCC, two triggers must be exceeded, first the total time period must exceed a known amount and in addition, the number of PA you must also exceed a threshold amount. Thus, in block 512 the monitoring is carried out of the type of regulation which has been considered. In some embodiments, it may only include a number of minutes that a PSAP is out of service and not be considered with the number of users that are out of service, depending on the regulation being considered. Step 512 continues until the outage ends or until a report is required as shown in step 514. Namely, if the time for reporting has come, then the system advances to step 514 and a report is made to the relevant agency. This monitoring continues within step 512 until sufficient cell towers have been repaired that an outage no longer needs to be considered for the area of interest. Thus, the system can conclude without ever advancing to step 514 if the number of selected towers is below a threshold number. The calculation continues in step 510 and step 512 until it is determined that a report is required or that the time has been extended such that no report will be needed. According to another embodiment, the system can query regarding indication of non-operating cell tower systems and revert to step 508 of determining the number of non-operating cell towers within the selected area. One example of this is shown in FIG. 6.

In particular, as shown in FIG. 6 if the system continues to receive a No in step 512, then a second period of time can start which has a different number of cell towers which are out of operation in the selected area, step 602. Namely, at step 602, a second time period is started and indication is received of the number of cell towers 12 that remain out of operation within the selected area 10. The system then advances to step 604 which calculates a second value of the amount of time remaining until the potentially affected users exceed the threshold for the reporting according to the relevant regulation. The second value is calculated during the second time period and the calculation continues as long as the second time period remains under consideration. Accordingly, at step 606 the question is asked whether the reporting time has come because the time period and the PAUM have been exceeded for the particular regulation. The query in step 606 continues during the second time and will continue as long as the second time period lasts. Accordingly, there is a dynamic update of the calculation at all times. And the time remaining for when a reporting is required is dynamically updated as shown in the graphical user interface 80 in FIGS. 4A-4D. If the thresholds are met for reporting during the second time period, then the system advances to step 608 and a report is made or, it continues to query whether or not the conditions for reporting have been met as shown in the no return line from step 606.

FIG. 7 illustrates one potential flow of operations that can be overlaid on the flow of FIG. 5 or FIG. 6 in one embodiment. The steps of FIG. 7 can potentially be used or not used depending on the desired embodiment. According to the steps shown in FIG. 7, an automatic determination is made when to terminate a selected time period based on a threshold set in the system, for example, when to stop the first time period and start a second time period. As explained herein, when the second time period is started then the number of towers which remain out of operation is obtained and new data is input in the system based on the number of towers out of operation at the start of the second time period. Thus, the steps of FIG. 7 is one method by which a particular time period can be terminated and another time period started. According to the embodiment shown in FIG. 7, a determination can be made whether or not the amount of time remaining until the outage threshold reporting requirement has been reached. Namely, the calculation is carried out to determine the amount of time remaining until reporting must be made of the outage according to the regulation under consideration as shown in step 702. The system advances to step 704 in which a query is conducted regarding whether the amount of time remaining before a report is due has reached an alert threshold time. Namely, is the remaining time before a report is due lower than a selected threshold time for which an alert has been set. This query is carried out in step 704 by the system by monitoring the amount of time remaining until a report is due. If the time remaining until a report is due is below the selected threshold, then the system advances to the next step 706 in which it requests an indication of the number of non-operating cell towers within the selected area at the then current time. In response to the query of step 706, the system will be provided either from a database to which it is connected, or from an operator who has been alerted to input the data, the number of non-operating cell towers at that particular time period. Once this has been received in step 708, the current time period will be concluded and a new time period will be started based on the number of towers then out of operation, step 710. The system will thus advance to step 710 in which the prior time period is concluded and will start a second time period with the number of currently non-operating cell towers present in the system for which the calculations are being made. The system will continue to calculate a second value for the amount of time remaining until a report is required, step 712, and provide an output to the system regarding the amount of remaining time. The data as determined in step 712 can be provided into the system and GUI of FIGS. 4A-4D so that the steps shown in FIG. 5, 6 or 7 can continue to be carried out or an operator can choose to take action, depending on the type of outage being monitored in the regulation under consideration.

Accordingly, a method is provide for alerting an operator the time remaining until an outage of cellular communication is needed and also dynamically updating the remaining time as more cell towers come back online and properly operate.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of dynamically tracking a cellular service outage within a selected area, the method comprising:

receiving a selection of an area of interest from an operator;

displaying identification data of the area of interest to the operator;

outputting operational state data that includes a number of cellular subscribers, cell tower systems, and public safety answering points within the area of interest;

determining an average number of subscribers per cell tower within the area of interest based on the operational state data;

receiving an indication of a number of non-operating cell tower systems within the area of interest over a first time period;

calculating a first value for an amount of time remaining until potentially affected user time within the area of interest exceeds an affected user threshold time based on a number of non-operating cell tower systems and an average number of subscribers per cell tower within the area of interest;

receiving an indication of non-operating cell tower systems within the area of interest over a second time period;

calculating a second value for the amount of time remaining until the potentially affected user time within the area of interest exceeds the affected user threshold time; and reporting a cellular outage in the area of interest in response to:

a sum of the first and second time periods exceeding a first time period threshold, and the potentially affected user time being above the affected user threshold time.

2. The method of claim 1 wherein receiving an indication of the number of non-operating cell tower systems within the area of interest over the first time period includes:
    receiving a report from a cell tower operational tracking database.

3. The method of claim 2 wherein the cell tower operational tracking database is a separate database from a first database.

4. The method of claim 3 further including:
    inputting, by an operator, the number of non-operating cell tower systems within the area of interest over the first time period into the first database.

5. The method of claim 3 further including:
    inputting, directly by a software data transfer, without assistance from an operator, the number of non-operating cell tower systems within the area of interest over the first time period into the first database.

6. The method of claim 1 further including:
    identifying each cell tower system that provides cellular service to a first public safety answering point within the area of interest; and
    reporting a local safety outage to the first public safety answering point in response to all cell tower systems that provide service to the first public safety answering point being out of service for a time period exceeding a second time period threshold.

7. The method of claim 6 wherein the first time period threshold and the second time period threshold are the same amount of time.

8. The method of claim 6 wherein the second time period threshold is shorter than the first time period threshold.

9. The method of claim 1 further including:
    inputting, by an operator, into a first database the value of the first time period after receiving an indication of the number of non-operating cell tower systems within the area of interest during the first time period and prior to calculating the first value for the amount of time remaining until the potentially affected user time within the area of interest exceeds the affected user threshold time.

10. The method of claim 1 further including:
    after an outage time period has passed, terminating the first time period and starting the second time period based on a software flag, without input by an operator.

11. The method of claim 1 further including:
    requesting to receive an indication of non-operating cell tower systems within the area of interest over the second time period and concluding the first time period in response to the amount of time remaining being less than an alert threshold of time.

12. A method of dynamically tracking time remaining before a report must be made of a cellular service outage within a selected area, the method comprising:
    receiving a selection of an area of interest;
    outputting operational state data of a first number of cell tower systems within the area of interest at a first time;
    receiving an indication of a first outage reporting time based on a first set of conditions occurring within the area of interest during a first time period;
    outputting operational state data of a second number of cell tower systems within the area of interest at a second time;

receiving an indication of a second outage reporting time based on a second set of conditions occurring within the area of interest during a second time period after the first time period;
    calculating an amount of time remaining until a report is to be made of an outage occurring, wherein the amount of time remaining is calculated based on a combination of the first set of conditions and the second set of conditions; and
    reporting the outage in the area of interest in response to the amount of time remaining requiring a report.

13. The method of claim 12 wherein the first set of conditions includes a number of public safety answering points within the area of interest.

14. The method of claim 12 further including:
    requesting to obtain operational state data of the number of cell tower systems within the area of interest at the second time in response to the amount of time remaining being less than a threshold amount of time.

15. The method of claim 12 further including:
    requesting to obtain operational state data of the number of cell tower systems within the area of interest at the second time in response to the number of cell tower systems in operation having changed by a threshold amount.

16. The method of claim 15 wherein the threshold amount is a percent of cell tower systems that have transitioned from non-operational to being operational.

17. The method of claim 12 further including:
    obtaining a number of cellular subscribers within the area of interest at the first time as one of the conditions in the first set of conditions.

18. A method of dynamically tracking time remaining before a report must be made of a cellular service outage within a selected area, the method comprising:
    receiving a selection of an area of interest;
    outputting operational state data of a first number of cell tower systems within the area of interest at a first time;
    receiving an indication of a first outage reporting time based on a first set of conditions occurring within the area of interest during a first time period;
    outputting operational state data of a second number of cell tower systems within the area of interest at a second time, wherein the operational state data of the second number of cell tower systems within the area of interest at the second time is obtained in response to a number of cell tower systems in operation having changed by a threshold amount, wherein the threshold amount is a percent of cell tower systems that have transitioned from non-operational to being operational;
    receiving an indication of a second outage reporting time based on a second set of conditions occurring within the area of interest during a second time period after the first time period; and
    calculating an amount of time remaining until a report is to be made of an outage occurring, wherein the amount of time remaining is calculated based on a combination of the first set of conditions and the second set of conditions.

19. The method of claim 18 further including:
    reporting the outage in the area of interest in response to the amount of time remaining requiring a report.

20. The method of claim 18 further including:
    requesting to obtain operational state data of the number of cell tower systems within the area of interest at the second time in response to the amount of time remaining being less than a threshold amount of time.

* * * * *